United States Patent
Watanabe et al.

(10) Patent No.: US 9,838,929 B2
(45) Date of Patent: Dec. 5, 2017

(54) RADIO COMMUNICATION SYSTEM AND HANDOVER CONTROL METHOD

(71) Applicant: NEC Corporation, Tokyo (JP)

(72) Inventors: Yoshinori Watanabe, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/420,339

(22) PCT Filed: Aug. 1, 2013

(86) PCT No.: PCT/JP2013/004664
§ 371 (c)(1),
(2) Date: Feb. 6, 2015

(87) PCT Pub. No.: WO2014/024438
PCT Pub. Date: Feb. 13, 2014

(65) Prior Publication Data
US 2015/0208308 A1    Jul. 23, 2015

(30) Foreign Application Priority Data

Aug. 6, 2012  (JP) .................................. 2012-173708

(51) Int. Cl.
*H04W 36/00* (2009.01)
*H04W 36/16* (2009.01)
(Continued)

(52) U.S. Cl.
CPC ......... *H04W 36/165* (2013.01); *H04W 28/04* (2013.01); *H04W 36/0083* (2013.01);
(Continued)

(58) Field of Classification Search
CPC .................................................. H04W 36/165
(Continued)

(56) References Cited

U.S. PATENT DOCUMENTS

2007/0015510 A1*  1/2007  Xiang ................... H04W 48/14
455/436
2011/0086635 A1  4/2011  Grob-Lipski
(Continued)

FOREIGN PATENT DOCUMENTS

EP          2166796 A1     3/2010
JP        2011-259206     12/2011
(Continued)

OTHER PUBLICATIONS

International Search Report corresponding to PCT/JP2013/004664, mail date Sep. 17, 2013, 3 pages.
(Continued)

*Primary Examiner* — Joel Ajayi
(74) *Attorney, Agent, or Firm* — Wilmer Cutler Pickering Hale and Dorr LLP

(57) ABSTRACT

A radio communication system and a handover control method are provided that can reduce abnormal disconnections of communication attributable to handover to from another cell an own cell. Provided are a handover suppression section (102) that, when receiving from a base station (30A) managing a first cell (35A) a request for handover to a second cell (35B), suppresses the handover in accordance with the degree of handover suppression, a handover failure detection section (13) that detects a handover failure caused by the handover suppression, and a handover suppression optimization section (203) that adjusts the degree of handover suppression based on the rate of handover failure occurrence.

35 Claims, 12 Drawing Sheets

(51) Int. Cl.
  H04W 36/08   (2009.01)
  H04W 28/04   (2009.01)
  H04W 36/30   (2009.01)
  H04W 88/02   (2009.01)
  H04W 88/08   (2009.01)

(52) U.S. Cl.
  CPC ... *H04W 36/0088* (2013.01); *H04W 36/0094* (2013.01); *H04W 36/08* (2013.01); *H04W 36/30* (2013.01); *H04W 88/02* (2013.01); *H04W 88/08* (2013.01)

(58) Field of Classification Search
  USPC .................................................. 455/436–448
  See application file for complete search history.

(56) References Cited

U.S. PATENT DOCUMENTS

2013/0084871 A1   4/2013   Kitaji et al.
2013/0344871 A1   12/2013  Kallin et al.

FOREIGN PATENT DOCUMENTS

| WO | WO-2010-002926 | 1/2010 |
| WO | WO-2012/078083 A1 | 6/2012 |
| WO | WO-2012/090357 | 7/2012 |

OTHER PUBLICATIONS

3GPP TS36.331 V.9.3.0 (5.5.4.4, pp. 75-76), (Jun. 2010), 3rd Generation Partnership Project; Technical Specification Group Radio Access Network; Evolved Universal Terrestrial Radio Access (E-UTRA); Radio Resource Control (RRC); Protocol specification (Release 9), 250 pages.

3GPP TS36.330 v. 9.7.0 (22.4.2, pp. 158-159), (Mar. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; State 2 (Release 9),173 pages.

Written Opinion corresponding to PCT/JP2013/004664, mail date Sep. 17, 2013, 7 pages.

Ericsson "MRO for HetNet Mobility Scenarios", 3GPP TSG-RAN3 Meeting #73, R3-112055, Athens, Greece, Aug. 22-26, 2011, 3 pages.

Extended European Search Report issued in corresponding European Application No. 13827705.8, dated Mar. 3, 2016, 10 pages.

Nokia Siemens Networks, Nokia Corporation "Improved Mobility Robustness Using Enhanced Mobility State Estimation", 3GPP TSG-RAN WG2 Meeting #78, R2-122371, Prague, Czech Republic, May 21-25, 2012, 7 pages.

\* cited by examiner

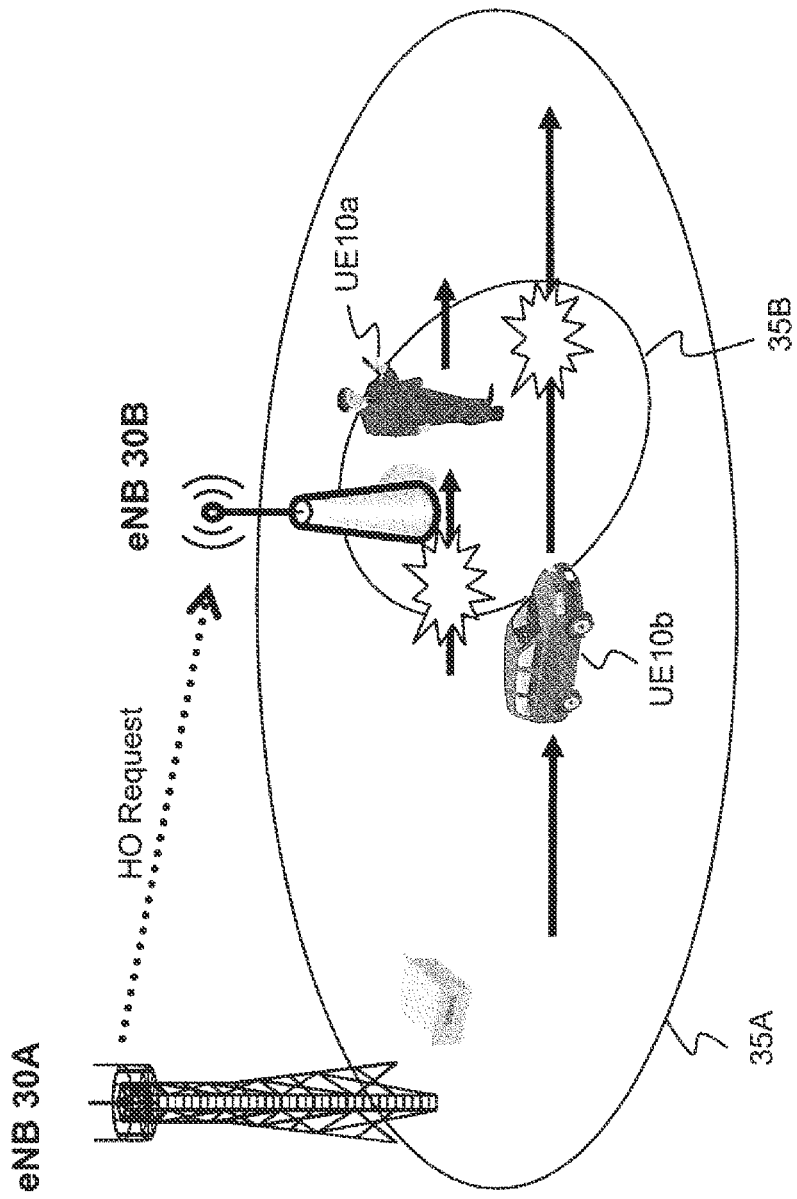

IN CASE OF TOO EARLY INCOMING HO
(LOW- TO MEDIUM-SPEED MOBILE TERMINAL UE 10a)

IN CASE OF TOO LATE INCOMING HO
(HIGH-SPEED MOBILE TERMINAL UE 10b)

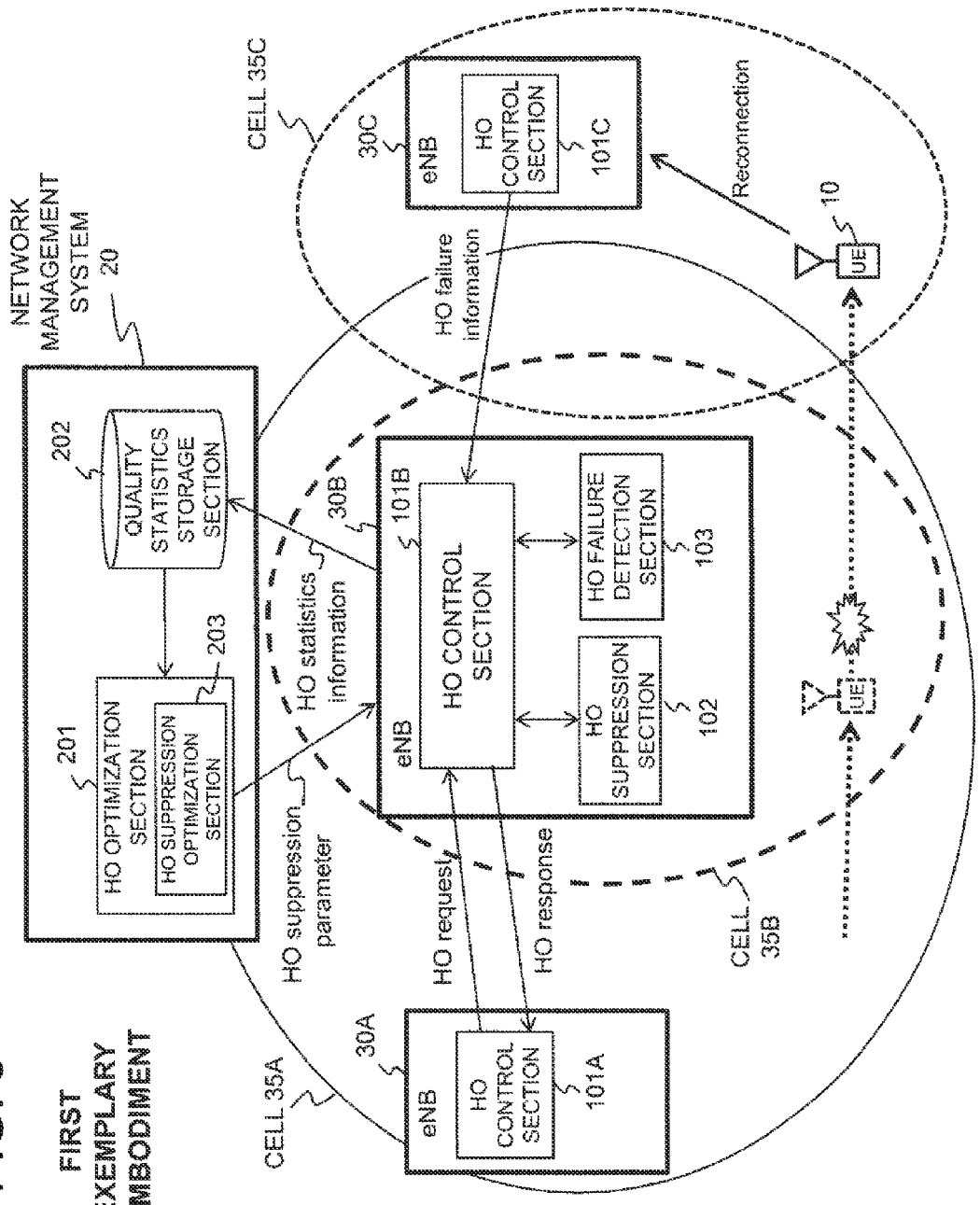

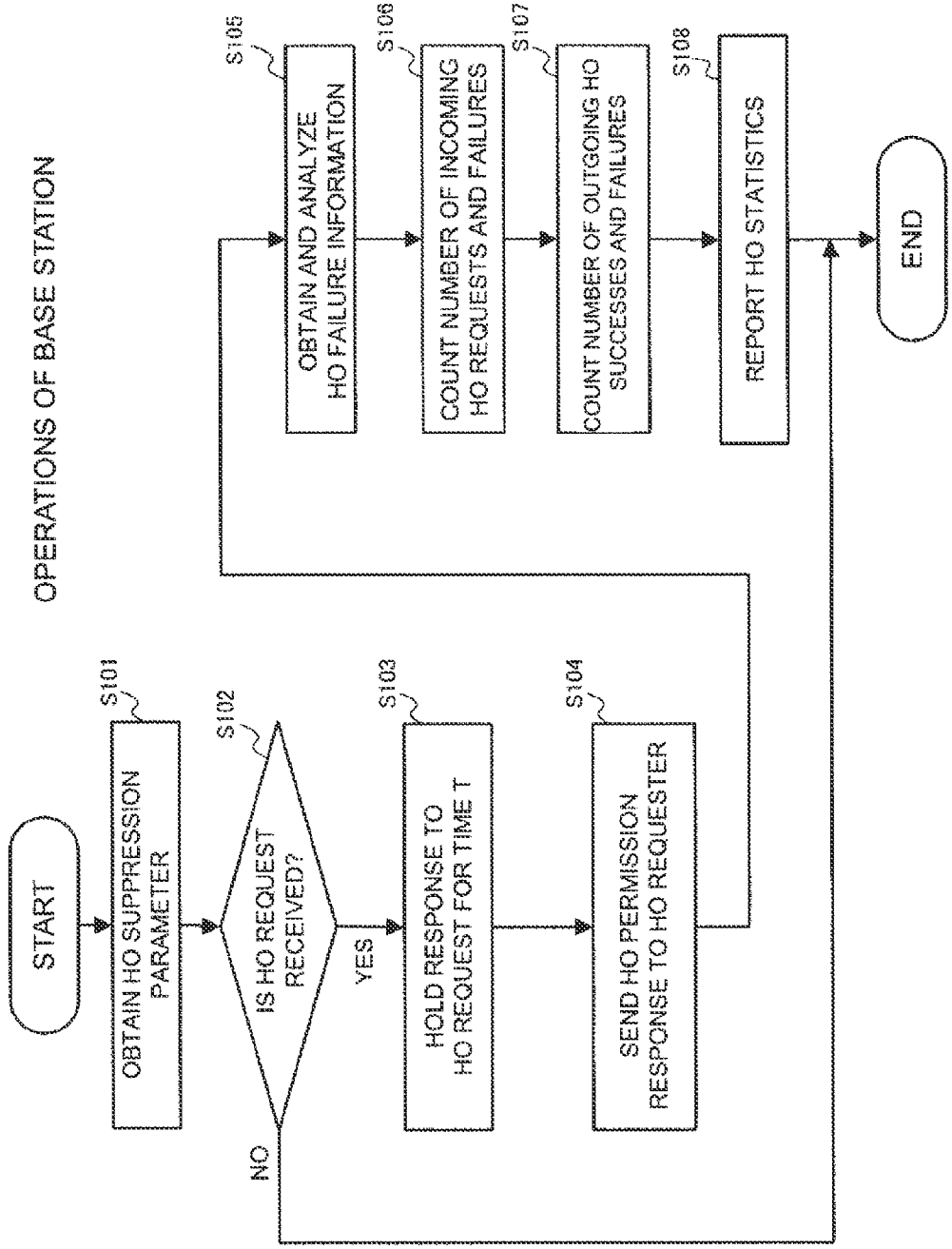

Too Late HO

Too Early HO

HO to Wrong Cell

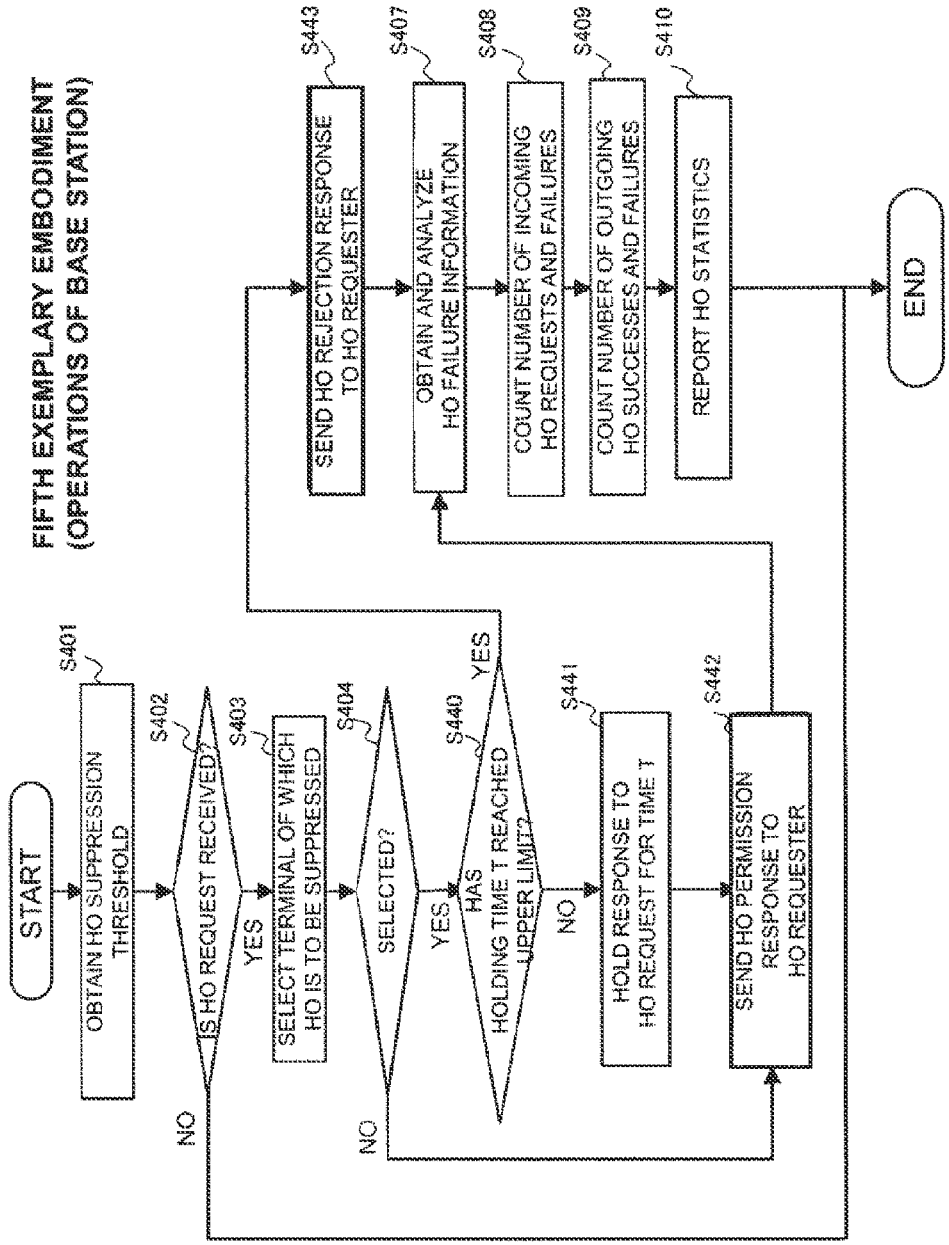

RADIO COMMUNICATION SYSTEM AND HANDOVER CONTROL METHOD

CROSS-REFERENCE TO RELATED APPLICATIONS

This application is a national stage application of International Application No. PCT/JP2013/004664 entitled "RADIO COMMUNICATION SYSTEM AND HANDOVER CONTROL METHOD," filed on Aug. 1, 2013, which claims the benefit of the priority of Japanese Patent Application No. 2012-173708, filed on Aug. 6, 2012, the disclosures of each of which are hereby incorporated by reference in their entirety.

TECHNICAL FIELD

The present invention relates to a radio communication system including multiple cells and, more particularly, to a radio communication system provided with handover control functionality, as well as to a handover control method.

BACKGROUND ART

In a radio communication system including multiple base stations, which manage multiple cells, when a mobile terminal moves from a cell to which it is connecting to another cell, processing for switching cells to connect to is performed, which is known as handover (hereinafter, abbreviated to HO as appropriate), whereby the mobile terminal can continue communication between cells. To implement handover of a mobile terminal, first, a base station that manages a cell being connected to (hereinafter, referred to as a source cell) instructs the mobile terminal to transmit a measurement report when a predetermined event occurs. Predetermined events include, for example, radio quality degradation in the source cell and the like. The measurement report by the mobile terminal includes a result of measurement of radio quality in the source cell and a group of its neighboring cells. The base station, when receiving the measurement report from the mobile terminal, determines a cell to be switched to (hereinafter, referred to as a target cell) based on the measurement report and starts a handover procedure including signaling with the mobile terminal and the target cell.

Examples of an event that may trigger the transmission of a measurement report are provided in NPL 1 by LTE (Long Term Evolution)/E-UTRAN (Evolved UTRAN). The substantial part of a reporting event, which is provided as Event A3 (Neighbor becomes offset better than serving) in NPL 1, is represented by the following expression (1):

$$P_s + O_s < P_t + O_t \quad (1)$$

where $P_s$ is a result of measurement of radio quality in the source cell, $P_t$ is a result of measurement of radio quality in a neighboring cell, $O_s$ is an offset value to the radio quality in the source cell, and $O_t$ is an offset value to the radio quality in the neighboring cell.

In LTE, $P_s$ and $P_t$ are the received power of a downlink reference signal, RSRP (Reference Signal Received Power), or the received quality of a reference signal, RSRQ (Reference Signal Received Quality). RSRQ is the ratio of RSRP to gross received power, RSSI (Received Signal Strength Indicator). Moreover, $O_s$ in the expression (1) acts on the radio quality of a downlink reference signal in the source cell, while $O_t$ acts on the radio quality of a downlink reference signal in the neighboring cell.

$O_t$ is a handover parameter generally referred to as a cell individual offset CIO, and a different offset value can be set for each neighboring cell registered in a neighbor list. CIOs are included in the neighbor list, which is notified by a base station to a mobile terminal that is connecting to a cell managed by this base station.

When an operation condition of the expression (1) is set on a base station, the operation condition of the expression (1) is notified to a mobile terminal that is connecting to a cell managed by the base station. If $P_s$ and $P_t$, which are results of measurement of the radio quality in the source cell and a neighbor cell, respectively, satisfy the condition of the expression (1), the mobile terminal, triggered by this fact, transmits a measurement report to the base station managing the source cell.

The base station, when receiving the measurement report from the mobile terminal, determines a target cell based on the measurement report and starts processing for handover to the target cell. In this event, if the start of handover is too late, the radio quality in the source cell falls below required quality before the handover to the target cell is completed, resulting in an abnormal disconnection of communication. On the other hand, if the start of handover is too early, the radio quality in the target cell falls below required quality immediately after the handover to the target cell is completed, resulting in an abnormal disconnection of communication.

In the case of a failure caused by the too late timing of handover to a target cell (hereinafter, referred to as "Too Late HO"), handover timing is advanced by increasing the CIO (i.e., the offset value $O_t$ in the expression (1)), whereby the handover success rate can be improved. On the other hand, in the case of a failure caused by the too early timing of handover to a target cell (hereinafter, referred to as "Too Early HO"), handover timing is delayed by decreasing the CIO, whereby the handover success rate can be improved. Accordingly, it is possible to reduce handover failures by dynamically adjusting a handover parameter such as the above-described offset value $O_t$ (CIO).

For example, PTL 1 discloses a handover optimization method in which HO failures (Too Late HOs, Too Early HOs) are reduced by dynamically adjusting HO parameters such as TTT (Time-To-Trigger) and CIO in units of cells, based on measurement reports from terminals.

According to NPL 2, three types of handover failure resulting in an abnormal disconnection of a radio link (RLF: Radio Link Failure), namely, "Too Late Handover," "Too Early Handover" and "Handover to Wrong Cell," are defined as follows (22.4.2). In the present description, these three types of handover failure will be treated as handover failures (HO failures).

<Too Late HO>

Too Late Handover is handover from a source cell to a target cell when a mobile terminal (UE) having experienced a RLF in the source cell during handover processing tries to reestablish a connection to the target cell (including reestablish of a radio link). Alternatively, it is a RLF occurring in the source cell when a mobile terminal having experienced a RLF in the source cell before handover is started tries to reestablish a connection to a cell different from the source cell.

<Too Early HO>

Too Early Handover is handover from a source cell to a target cell when a mobile terminal having experienced a RLF in the target cell during handover processing or immediately after handover is completed tries to reestablish a connection to the source cell.

<HO to Wrong Cell>

Handover to Wrong Cell is handover from a source cell to a target cell when a mobile terminal having experienced a RLF in the source or target cell during handover processing or immediately after handover is completed tries to reestablish a connection to a cell (neighbor) different from any of the source and target cells.

CITATION LIST

Patent Literature

[PTL 1]
International Patent Publication No. 2010/002926A1
Description

Non-Patent Literature

[NPL 1]
3GPP TS36.331 v.9.3.0 (5.5.4.4, pages 75-76)
[NPL 2]
3GPP TS36.300 v.9.7.0 (22.4.2, pages 158-159)

SUMMARY OF INVENTION

Technical Problem

However, in an environment where HO parameters for other cells cannot be adjusted, there are some times when a HO failure in an own cell cannot be resolved even by adjusting HO parameters in the own cell if the completion of incoming handover from another cell is too early or too late. Hereinafter, a description will be given of a circumstance where such a HO failure occurs, with reference to FIGS. 1 and 2.

FIG. 1 is a schematic diagram of a system architecture for describing an example of handover failure, and FIG. 2 are graphs showing changes over time in received quality in source and target cells with respect to handover of mobile terminals. First, in a radio communication system shown in FIG. 1, it is assumed that base stations (eNBs) 30A and 30B manage cells 35A and 35B, respectively, that the cell 35B exists within the cell 35A, and that mobile terminals (UEs) 10 (here, a low-speed mobile terminal 10a and a high-speed mobile terminal 10b) pass through the cell 35B while they continue communication.

When the low-speed mobile terminal 10a or high-speed mobile terminal 10b is present within the cell 35A as described above, there are some cases where handover is completed before the low-speed mobile terminal 10a entirely enters the cell 35B, and an abnormal disconnection, RLF, occurs immediately thereafter, as shown in FIG. 2A. Moreover, there are some cases where handover is completed immediately before the high-speed mobile terminal 10b passes through the cell 35B, and a RLF occurs immediately thereafter, as shown in FIG. 2B.

According to the handover optimization method disclosed in PTL 1, the timing of staring handover from an own cell to another cell can be adjusted, but the timing of starting handover from another cell to an own cell cannot be adjusted. Accordingly, if HO parameters for another cell are not appropriately set, a problem cannot be solved on an own cell side even when an abnormal disconnection of communication occurs immediately after handover to the own cell. Such a handover failure easily occurs particularly when the vendor of a base station of an own cell is different from that of a base station of another cell.

Accordingly, an object of the present invention is to provide a radio communication system and a handover control method that can reduce abnormal disconnections of communication caused by handover from another cell to an own cell.

Solution to Problem

A radio communication system according to the present invention is a radio communication system including base stations that manage cells to which mobile terminals connect, is characterized by comprising: a handover suppression means that, when receiving from a base station managing a first cell a request for handover to a second cell, suppresses the handover in accordance to a degree of handover suppression; a handover failure detection means that detects a handover failure attributable to the handover suppression; and a handover suppression optimization means that adjusts the degree of handover suppression based on a rate of occurrence of the handover failure.

A handover control method according to the present invention is a handover control method in a radio communication system including base stations that manage cells to which a mobile terminal connects, is characterized by comprising: when receiving from a base station managing a first cell a request for handover to a second cell, suppressing the handover in accordance with a degree of handover suppression; detecting a handover failure attributable to the handover suppression; and adjusting the degree of handover suppression based on a rate of occurrence of the handover failure.

Advantageous Effects of Invention

According to the present invention, it is possible to reduce abnormal disconnections of communication caused by handover from another cell to an own cell.

BRIEF DESCRIPTION OF DRAWINGS

FIG. 1 is a schematic diagram of a system architecture for describing an example of handover failure.

FIG. 3 is a block diagram showing schematic configurations of base stations and a network management system in a radio communication system according to a first exemplary embodiment of the present invention.

FIG. 4 is a flowchart showing an operation of a base station according to the first exemplary embodiment.

FIG. 12 is a flowchart showing an example of operations of a base station according to a fifth exemplary embodiment of the present invention.

DESCRIPTION OF EMBODIMENTS

Figure 2A:
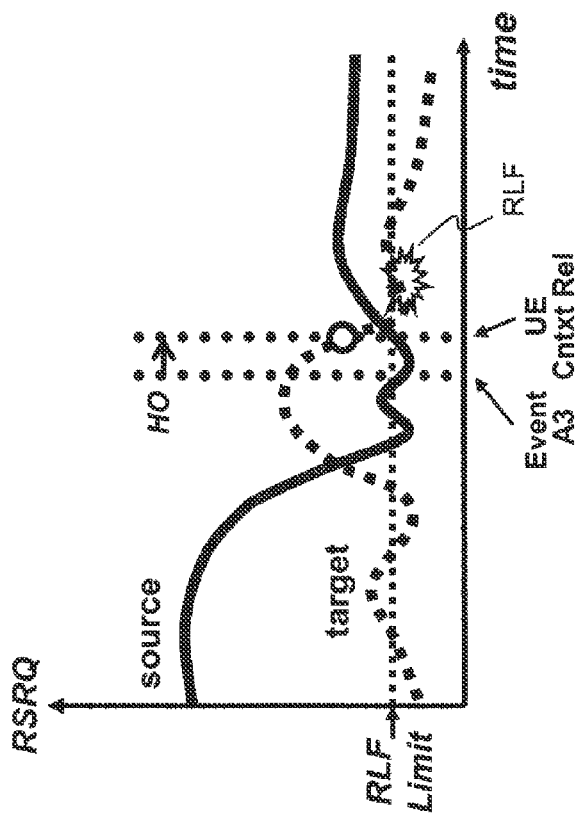
FIGS. 2A and 2B are graphs showing changes over time in received quality in source and target cells with respect to handover of mobile terminals.
Figure 2B:
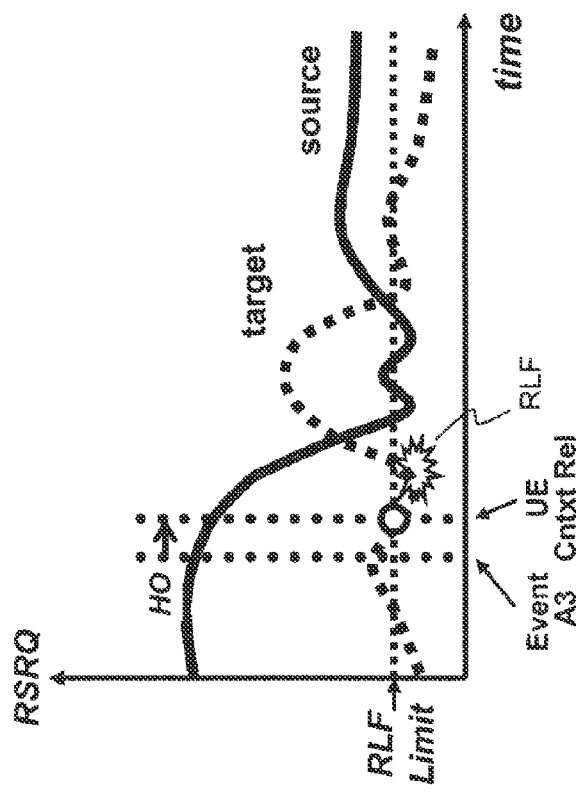

According to exemplary embodiments of the present invention, which will be described below, when a handover request is received from a base station managing another cell, handover from the another cell to an own cell is suppressed, and the degree of handover suppression is adjusted depending on handover quality after handover is suppressed. Thus, it is possible to reduce handover failures caused by incoming handover from another cell in an environment where HO parameters for other cells cannot be adjusted.

1. First Exemplary Embodiment 1.1) System Architecture

FIG. 3 is a block diagram showing schematic configurations of base stations and a network management system in a radio communication system according to a first exemplary embodiment of the present invention. In FIG. 3, base stations (eNBs) 30A and 30B manage cells 35A and 35B, respectively, and the cell 35B exists within the cell 35A. Moreover, it is assumed that another cell 35C is located so as to neighbor on the cells 35A and 35B and that a base station 30C manages the cell 35C. Furthermore, a network management system 20 is provided and performs optimization control on handover between the base stations. Note that the present invention is not limited to the system architecture shown in FIG. 3 but is applicable to inter-cell handover in any cell topologies.

In the following, a description will be given of a case as an example where a mobile terminal 10 enters the cell 35B from the cell 35A, when handover from the base station 30A to the base station 30B fails in the cell 35B, and the mobile terminal 10 goes straight into the other cell 35C and reconnects to the base station 30C. When the mobile terminal 10 enters the cell 35B from the cell 35A (incoming HO), the cell 35A is a source cell and the cell 35B is a target cell. Moreover, when the mobile terminal 10 leaves the cell 35B for the cell 35A/35O (outgoing HO), the cell 35B is a source cell and the cell 35A/35O is a target cell.

The base stations 30A, 30B and 30C have the same configurations, of which only parts relevant to the description of the present exemplary embodiment are shown in FIG. 3. The base stations 30A, 30B and 30C include handover control sections 101A, 101B and 101C, respectively, which perform handover control. Further, the base station 30B managing the cell 35B has a handover suppression section 102 and a handover failure detection section 103 as functionality relevant to operations in the present exemplary embodiment.

The handover suppression section 102, when receiving a handover request from the base station 30A managing the cell 35A, holds the transmission of a handover response thereto for a predetermined period of time T, which will be described later. When the mobile terminal 10 has reconnected to the base station 30C in the cell 35C, the base station 30C notifies the base station 30B of handover failure information, which will be described later. The handover failure detection section 103, when obtaining the handover failure information from the base station 30C managing the cell 35C, detects failures of incoming HO to the cell 35B and failures of outgoing HO from the cell 35B and reports handover statistics information including the number of the detected handover failures to the network management system 20.

The network management system 20 includes a handover optimization section 201 and a quality statistics storage section 202, and the handover optimization section 201 is provided with a handover suppression optimization section 203. The quality statistics storage section 202 obtains handover statistics information from each base station, and the handover optimization section 201 sets a handover suppression parameter for the base stations, depending on handover quality after handover is suppressed, which will be described later.

Handover failures (HO failures) have three types, namely, Too Late HO, Too Early HO and HO to Wrong Cell, as described already. For the handover failure information, for example, RLF Indication and Handover Report prescribed in 3GPP TS36.423 v.9.5.0 can be used (9.1.2.18 and 9.1.2.19). RLF Indication includes the identification information of a mobile terminal that has suffered an abnormal disconnection, the identification information of a cell to which connection had been made immediately before the abnormal disconnection, and the identification information of a cell to which reconnection is made after the abnormal disconnection. Handover Report includes the identification information of source and target cells and the type of a handover failure. Hereinafter, a detailed description will be given of operations of the base station and the network management system 20 according to the present exemplary embodiment with reference to drawings.

1.2) Operations of Base Station

FIG. 4 is a flowchart showing operations of the base station according to the first exemplary embodiment. Referring to FIG. 4, first, the handover suppression section 102 of the base station 30B obtains a handover suppression parameter from the network management system 20 (Operation S101). In the present exemplary embodiment, the handover suppression parameter is a period of time T of holding a handover response.

Subsequently, when the handover control section 101B receives a request for handover of the mobile terminal 10 from the base station 30A (Operation S102; YES), the handover suppression section 102 holds the transmission of a response to the handover request for the period of time T indicated by the handover suppression parameter (Operation S103) and, when the holding period of time T has elapsed, returns a handover permission response to the base station 30A (Operation S104).

Subsequently, when handover failure information is obtained from the base station 30C managing the cell 35C, the handover failure detection section 103 analyzes handover failures (Operation S105), which will be described below, counts the numbers of incoming HO requests and failures and the numbers of outgoing HO successes and failures (Operations S106 and S107), and reports handover statistics information to the network management system 20 (Operation S108). The handover statistics information includes the numbers of incoming HO requests and failures and the numbers of outgoing HO successes and failures counted in Operations S106 and S107. Hereinafter, handover failure detection will be described in detail.

1.3) Detection of Outgoing HO Failure

The handover failure detection section 103 can detect a failure of outgoing HO from the cell 35B by using handover failure information (i.e., RLF Indication and Handover Report), depending on whether or not it agrees with the following conditions.

<Too Late HO>

Figure 5A:
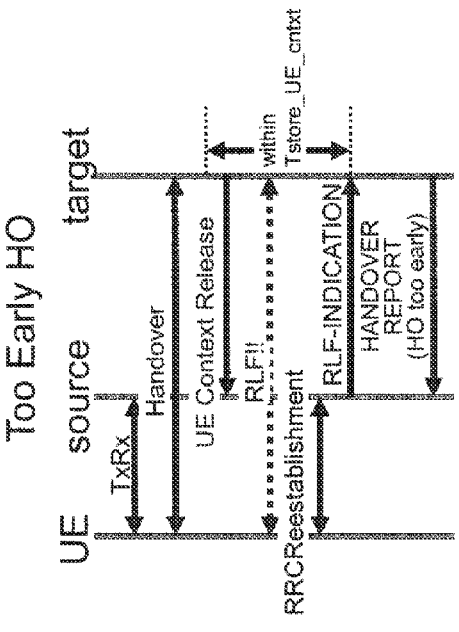
FIG. 5A is a sequence diagram showing Too Late HO.

Referring to FIG. 5A, a base station of a source cell can detect Too Late HO on the conditions that it has received a RLF Indication message from a target cell (in the case where handover has been started) or a cell different from the source cell (in the case where handover has not been started) and that it did not sent a UE Context Release message to another cell within a predetermined period of time ($T_{store\_UE\_cntxt}$) prior to the receipt of the RLF Indication.

<Too Early HO>

Figure 5B:
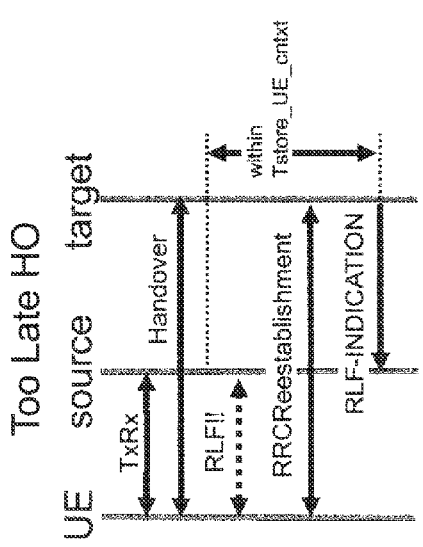
FIG. 5B is a sequence diagram showing Too Early HO.

Referring to FIG. 5B, a base station of a target cell, when receiving a RLF Indication message from a base station of a source cell, sends a Handover Report message indicative of Too Early HO to the base station of the source cell if it already sent a UE Context Release message to the base station of the source cell within a predetermined period of time ($T_{store\_UE\_cntxt}$) prior to the receipt of the RLF Indication. Accordingly, the base station of the source cell can detect Too Early HO on the conditions that it has received a Handover Report message and that Hanover Report Type IE indicates Too Early HO.

<HO to Wrong Cell>

Figure 5C:
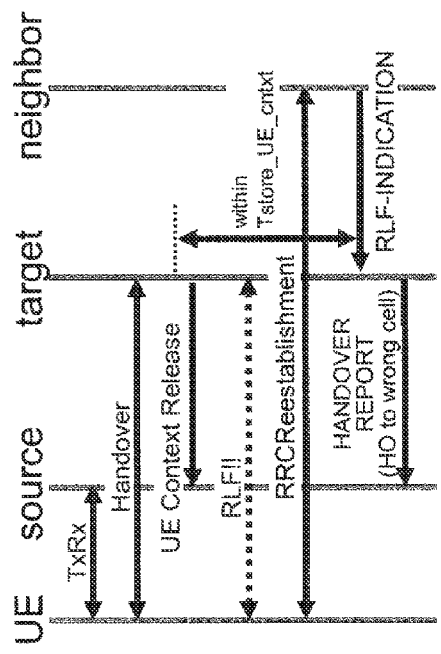
FIG. 5C is a sequence diagram showing HO to Wrong Cell.

Referring to FIG. 5C, a base station of a target cell, when receiving a RLF Indication message from a neighboring cell, sends a Handover Report message indicative of HO to Wrong Cell to a base station of a source cell if it already sent a UE Context Release message to the base station of the source cell within a predetermined period of time ($T_{store\_UE\_cntxt}$) prior to the receipt of the RLF Indication. Accordingly, the base station of the source cell can detect HO to Wrong Cell on the conditions that it has received a Handover Report message and that Hanover Report Type IE indicates HO to Wrong Cell.

<Success of Handover>

The success of handover can be detected by eliminating the above-described Too Early HOs and HOs to Wrong Cell from handovers in which a UE Context Release message indicative of the completion of handover is received from a target cell.

1.4) Detection of Incoming HO Failure

Next, the detection of an incoming HO failure by the handover failure detection section 103 will be described with reference to FIG. 6.

Figure 6:
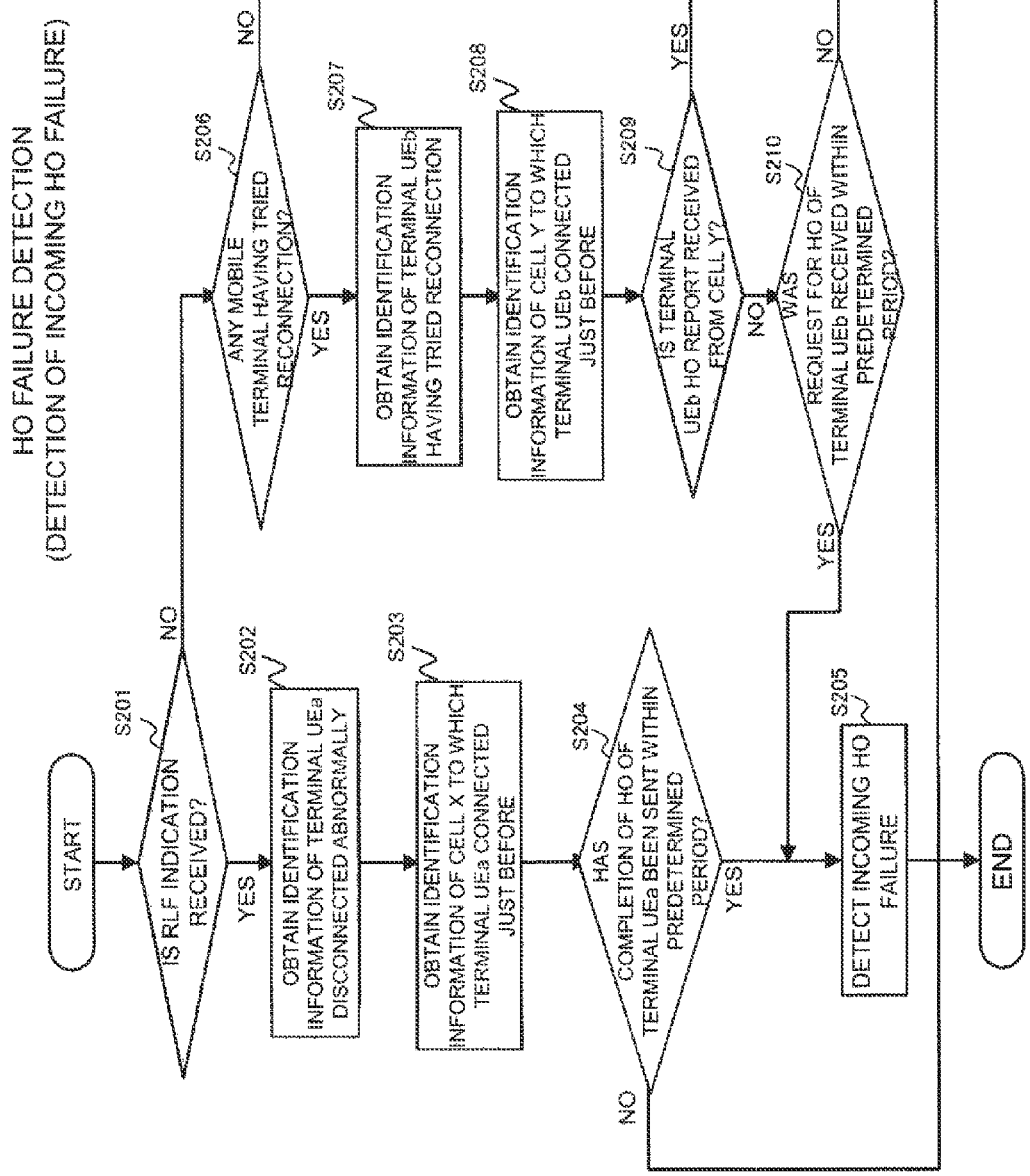
FIG. 6 is a flowchart showing HO failure detection in the first exemplary embodiment.

FIG. 6 is a flowchart showing the detection of an incoming HO failure in HO failure detection. Referring to FIG. 6, the handover failure detection section 103 determines whether or not a RFL Indication message is received (Operation S201). If a RLF Indication message is received (Operation S201; YES), the handover failure detection section 103 obtains the identification information of a mobile terminal that has suffered an abnormal disconnection (hereinafter, referred to as a terminal UEa) (Operation S202). Subsequently, the handover failure detection section 103 obtains the identification information of a cell X to which the terminal UEa connected just before (Operation S203). Subsequently, the handover failure detection section 103 determines whether or not a handover completion message with respect to the terminal UEa has been sent to the cell X within a predetermined period of time (Operation S204) and, if it has been sent (Operation S204; YES), detects an incoming HO failure (Operation S205) and finishes the processing. Note that if the terminal UEa is not a target of HO suppression (Operation S204; NO), the processing is terminated immediately.

When a RLF Indication message is not received (Operation S201; NO), the handover failure detection section 103 of the base station 30B determines whether or not there is a mobile terminal that has tried reconnection to the cell 35B (Operation S206) and, if there is a mobile terminal that has tried reconnection (hereinafter, referred to as a terminal UEb) (Operation S206; YES), obtains the identification information of this terminal UEb (Operation S207). Subsequently, the handover failure detection section 103 obtains the identification information of a cell Y to which the terminal UEb connected just before (Operation S208). Subsequently, the handover failure detection section 103 determines whether or not a HO Report message with respect to the terminal UEb is received from the cell Y (Operation S209) and, if a HO Report message is not received from the cell Y (Operation S209; NO), further determines whether or not a request for handover of the terminal UEb was received from the cell Y within a predetermined period of time before the trial of reconnection (Operation S210). If a request for handover of the terminal UEb was received from the cell Y within the predetermined period of time (Operation S210; YES), the handover failure detection section 103 detects an incoming HO failure (Operation S205) and finishes the processing. Note that the processing is terminated immediately when there is not a terminal UEb that has tried reconnection (Operation S206; NO), or when a HO Report message with respect to the terminal UEb is received from the cell Y (Operation S209; YES), or when a request for handover of the terminal UEb was not received from the cell Y within the predetermined period of time (Operation S210; NO).

As described above, the detection of a failure of incoming HO of a mobile terminal entering the cell 35B is divided into two systems. First, when a RLF Indication message is received (Operation S201; YES), an incoming HO failure is determined because, referring to FIG. 5 for example, incoming HO of the terminal UEa was completed before the receipt of the RLF Indication message but the point of time the handover of this mobile terminal was completed is within a predetermined period of time ($T_{store\_UE\_cntxt}$) prior to the receipt of the RLF Indication message (i.e., notification of an abnormal disconnection). On the other hand, in a case where a RLF Indication message is not received (Operation S201; NO) and there is a terminal UEb that has tried reconnection to the cell 35B (Operation S206; YES), an incoming handover failure is determined because, referring to FIG. 5 for example, a HO Report message is not received from another cell and a request for handover of the same terminal UEb was received within a predetermined period of time before the reconnection.

1.5) Handover Optimization

First Example

Next, a description will be given of operations of the handover optimization section 201 of the network management system 20 with reference to FIG. 7.

Figure 7:
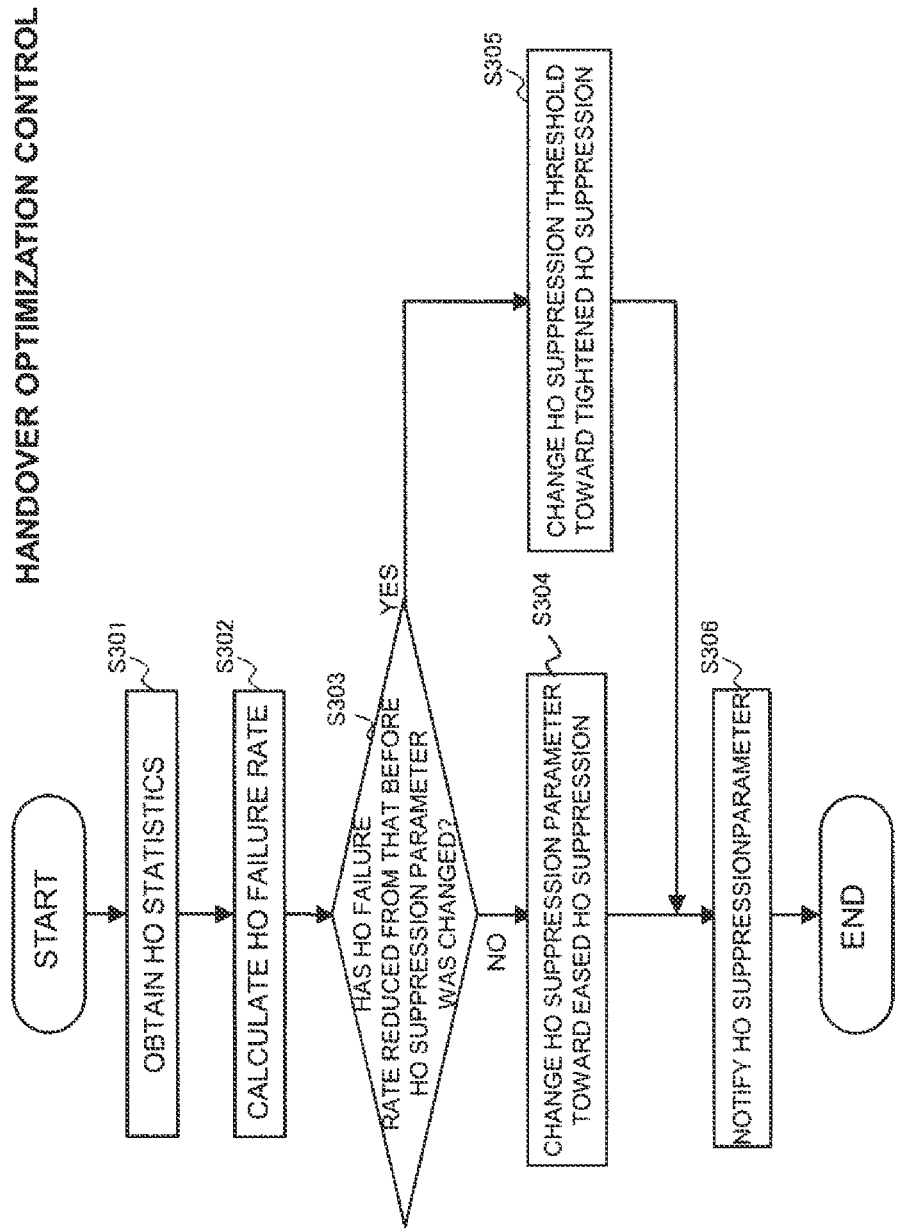
FIG. 7 is a flowchart showing HO optimization operation according to the first exemplary embodiment.

FIG. 7 is a flowchart showing HO optimization operation in the present exemplary embodiment. Referring to FIG. 7, the network management system 20 obtains handover statistics information from base stations and stores it in the quality statistics storage section 202 (Operation S301). The handover statistics information includes the numbers of incoming HO requests and failures and the numbers of outgoing HO successes and failures counted at each base station. The handover suppression optimization section 203 calculates a handover failure rate Rf, which indicates handover quality, based on the obtained handover statistics information (Operation S302). The handover failure rate Rf can be calculated as follows.

Definition 1 of HO failure rate:

$Rf$=(number of outgoing HO failures+number of incoming HO failures)/(number of outgoing HO successes+number of outgoing HO failures+ number of incoming HO requests)

Subsequently, the handover suppression optimization section 203 reads out handover statistics information stored in the quality statistics storage section 202 and determines whether or not the handover failure rate has reduced compared with that before the handover suppression parameter was changed (Operation S303). If the handover failure rate has not decreased from that before the handover suppression parameter was changed (Operation S303; NO), the handover suppression parameter is changed toward eased handover suppression (Operation S304). When the handover suppression parameter is a holding period of time T, handover suppression is tightened by increasing the holding period of time T and is eased by decreasing the holding period of time T.

If the handover failure rate has decreased from that before the handover suppression parameter was changed (Operation S303: YES), the handover suppression optimization section 203 changes the handover suppression parameter toward tightened handover suppression (Operation S305). The handover suppression parameter thus determined in Operation S304 or S305 is notified to the base stations (Operation S306).

As described above, the handover optimization section 201 sequentially changes the handover suppression parameter, based on the amount of a change in the handover failure rate before and after the handover suppression parameter is changed, and notifies it to the base stations.

1.6) Handover Optimization

Second Example

Apart from the above-described definition, the HO failure rate Rf can also be calculated by defining it as follows.

Definition 2 of HO failure rate:

$Rf$=(number of outgoing Too Late HOs+number of incoming HO failures)/(number of outgoing HO successes+number of outgoing Too Late HOs+ number of incoming HO requests)

In the case of this definition as well, a flow of HO optimization operation is as shown in FIG. 7 and therefore a description thereof will be omitted. However, it is necessary to detect the type of a HO failure (outgoing Too Late HO). Outgoing Too Late HO can be detected by satisfying the following conditions, as described in FIG. 5A.

Condition 1: a base station of a source cell has received a RLF Indication message from a target cell (in the case where handover has been started) or a cell different from the source cell (in the case where handover has not been started).

Condition 2: it did not sent a UE Context Release message to another cell within a predetermined period of time ($T_{store\_UE\_cntxt}$) prior to the receipt of the RLF Indication.

1.7) Another Example of Holding of HO Response

In the above-described operation in which a HO response is hold for the period of time T indicated by the handover suppression parameter (Operation S103 in FIG. 4), an individual holding period of time Ts may be applied to each handover-requesting cell. In this case, the handover failure detection section 103 counts the numbers of incoming HO requests and failures in each handover-requesting cell (Operation S106) and reports handover statistics information to the network management system 20 (Operation S108). The handover suppression optimization section 203 of the network management system 20 calculates the handover failure rate for each handover-requesting cell, based on the incoming HO statistics information counted for each handover-requesting cell and outgoing HO statistics information counted for each source cell, adjusts the holing period of time Ts depending on the handover failure rate Rf, and sends it to each base station.

As described above, the holding period of time Ts is set for each handover-requesting cell, whereby it is possible to efficiently suppress outgoing HO failures caused by incoming HO suppression when the optimized values of holding period of time for individual cells vary widely.

1.8) Effects

According to the first exemplary embodiment of the present invention, when a handover request is received from a base station managing another cell, a response to this handover request is hold for a period of time T, thereby suppressing the handover. The handover optimization section adjusts the degree of handover suppression (the holding period of time T) depending on handover quality after handover is suppressed. Thus, in an environment where HO parameters for other cells cannot be adjusted, it is possible to temporally control incoming handover from another cell, whereby it is possible to reduce handover failures caused by this incoming handover.

2. Second Exemplary Embodiment

According to a second exemplary embodiment of the present invention, the different point from the first exemplary embodiment is that a mobile terminal whose mobility state satisfies a predetermined condition is selected and handover suppression is controlled on the selected mobile terminal. Hereinafter, a radio communication system and operations of a base station according to the second exemplary embodiment will be described in detail, focusing on the different point from the first exemplary embodiment.

2.1) System Architecture

Figure 8:
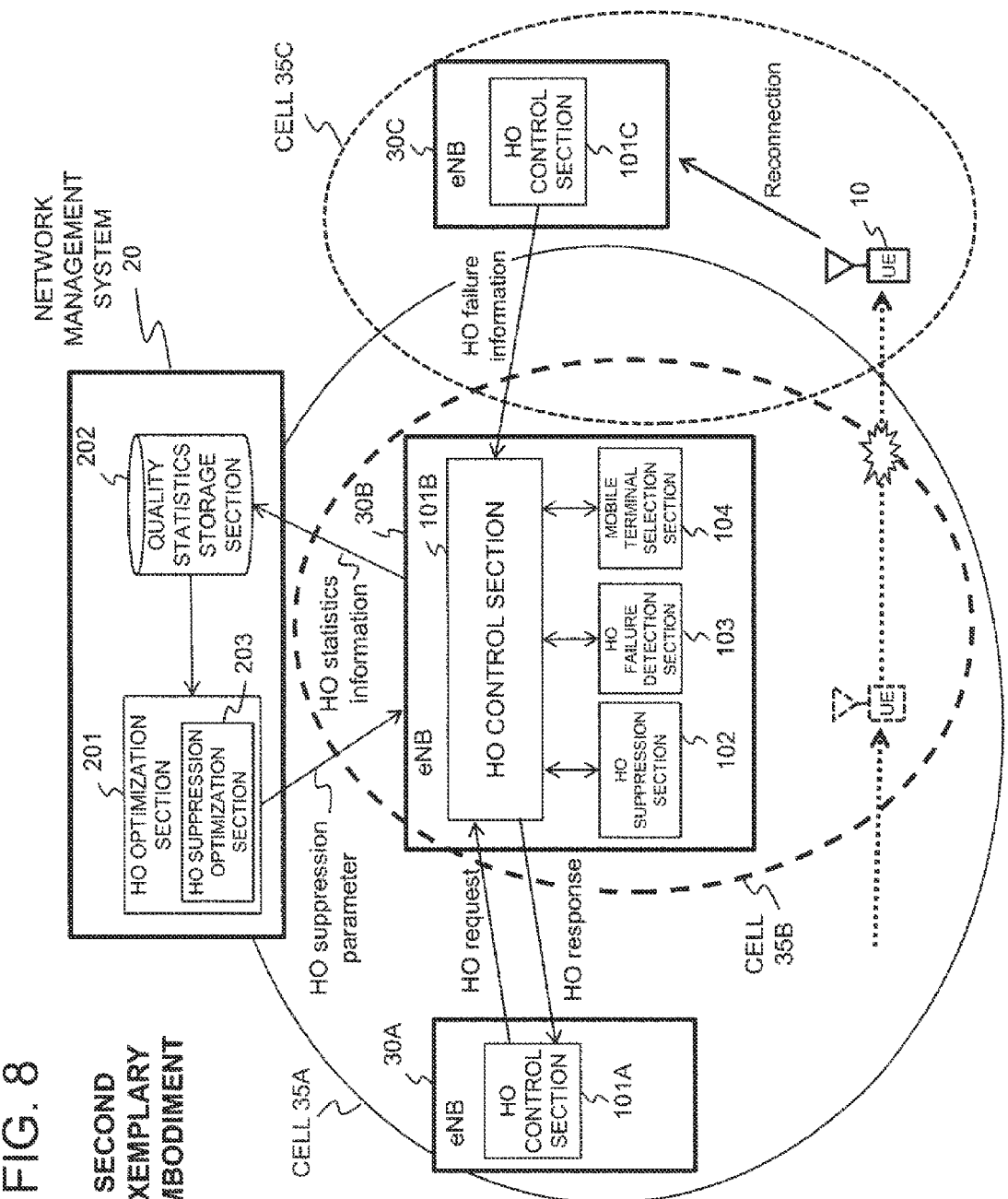
FIG. 8 is a block diagram showing schematic configurations of base stations and a network management system in a radio communication system according to a second exemplary embodiment of the present invention.

FIG. 8 is a block diagram showing schematic configurations of base stations and a network management system in the radio communication system according to the second exemplary embodiment of the present invention. However, the blocks having the same functions as those in the system architecture of the first exemplary embodiment shown in FIG. 3 are given the same reference signs as in FIG. 3, and a description thereof will be omitted.

A base station 30B managing a cell 35B includes a handover suppression section 102, a handover failure detection section 103 and a mobile terminal selection section 104, as functions relevant to operations in the present exemplary embodiment. The mobile terminal selection section 104 selects a mobile terminal whose mobility state satisfies a predetermined condition, and the handover suppression section 102 suppresses incoming handover of the selected mobile terminal. Hereinafter, a detailed description will be given of operations of the base station 30B and the network management system 20.

2.2) Operations of Base Station

Figure 9:
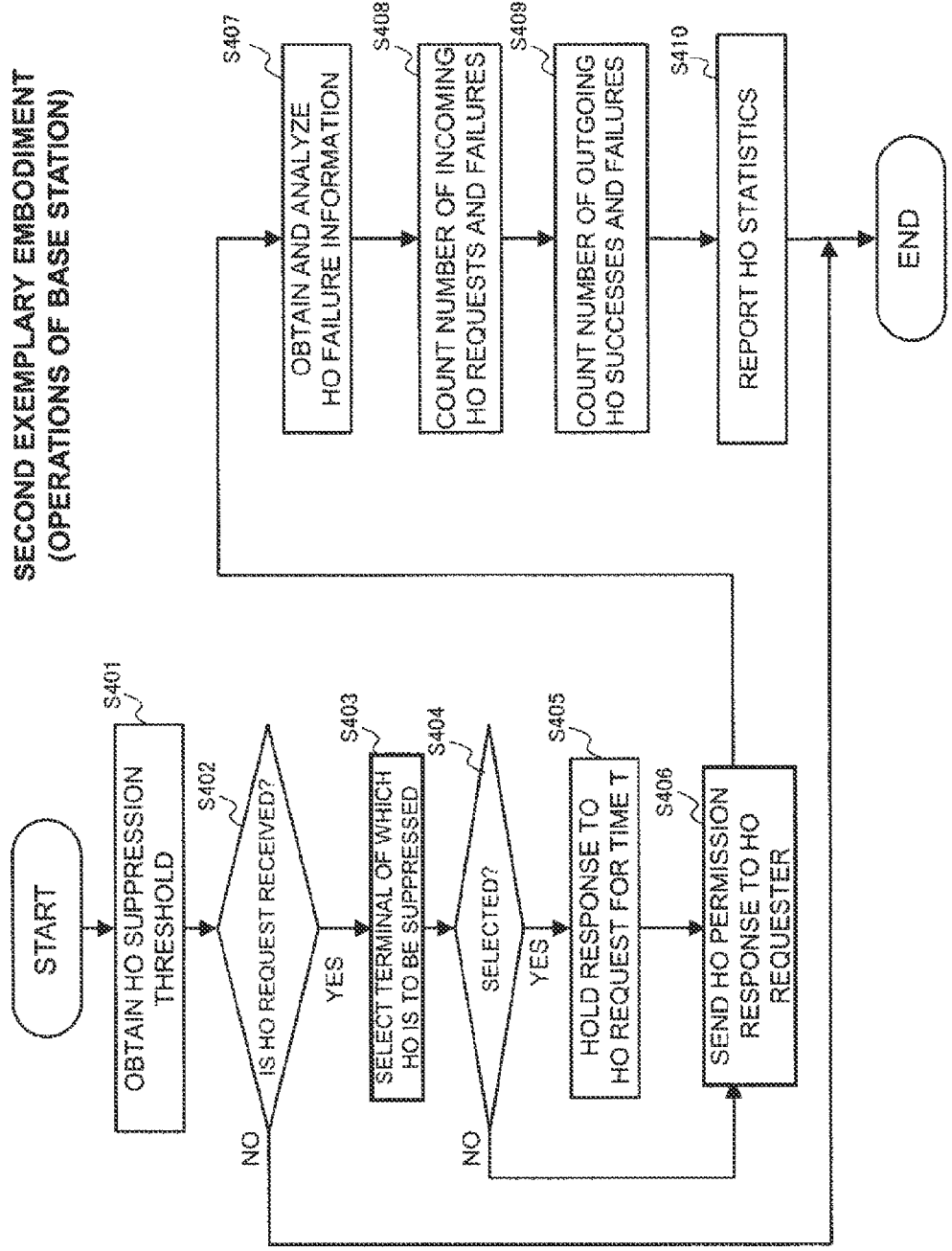
FIG. 9 is a flowchart showing operations of a base station according to the second exemplary embodiment.

FIG. 9 is a flowchart showing operations of a base station according to the second exemplary embodiment. Referring to FIG. 9, first, the handover suppression section 102 of the base station 30B obtains handover suppression parameters from the network management system 20 (Operation S401). In the present exemplary embodiment, the handover suppression parameters include a period of time T of holding a handover response and a threshold of a mobile terminal selection criterion. The selection criterion threshold is determined, taking into consideration a mobility state in which a handover failure is highly possible. For example, a threshold v of mobility speed of a mobile terminal or a threshold Tave of average duration of a mobile terminal's stay in cells can be used.

Subsequently, when a handover control section 101B has received a request for handover of a mobile terminal 10 from a base station 30A (Operation S402; YES), the mobile terminal selection section 104 selects a mobile terminal of which handover should be suppressed, based on the above-mentioned mobile terminal section criterion (Operation S403). When the selection criterion is the mobility speed threshold V, a mobile terminal whose mobility speed is not lower than the threshold V is selected as a target of handover suppression, or when the selection criterion is the average cell stay duration threshold Tave, a mobile terminal whose average duration of stay in cells where it stayed in the past is not longer than the threshold Tave is selected as a target of handover suppression. Note that the duration of a mobile terminal's stay in cells in the past can be obtained from, for example, UE History Information prescribed in NPL 3, which is notified at the time of HO request from a requesting base station. Moreover, when the selection criterion is the mobility speed threshold V, a mobile terminal whose mobility speed is lower than V may be selected as a target of handover suppression, or when the selection criterion is the average cell stay duration threshold Tave, a mobile terminal whose average stay duration is longer than the threshold Tave may be selected as a target of handover suppression.

The handover suppression section 102 determines whether or not the mobile terminal 10, of which handover is requested, is a mobile terminal selected by the mobile terminal selection section 104 (Operation S404). If the mobile terminal 10 is a selected one (Operation S404; YES), the handover suppression section 102 holds the transmission of a response to the handover request for the period of time T indicated by the handover suppression parameter (Operation S405) and, when the holding period of time T has elapsed, returns a handover permission response to the base station 30A (Operation S406). If the mobile terminal 10 is not a selected one (Operation S404; NO), a handover permission response is returned to the base station 30A without being hold (Operation S406).

Subsequently, the handover failure detection section 103, when obtaining handover failure information from a base station 30C managing a cell 35C, analyses handover failures as described in the first exemplary embodiment (FIG. 4) (Operation S407), counts the numbers of incoming HO requests and failures and the numbers of outgoing HO successes and failures (Operations S408 and S409), and reports handover statistics information to the network management system 20 (Operation S410). The handover statistics information includes the numbers of incoming HO requests and failures and the numbers of outgoing HO successes and failures counted in Operations S408 and S409.

2.3) Handover Optimization

A handover suppression optimization section 203 of the network management system 20 in the present exemplary embodiment basically operates as shown in FIG. 7 but is different in that it adjusts not only the holding time threshold but also the threshold of a mobile terminal selection criterion. Hereinafter, this different point will be described.

Referring to FIG. 7, when obtaining handover statistics information from each base station (Operation S301), the handover suppression optimization section 203 calculates the handover failure rate Rf based on the obtained handover statistics information (Operation S302) and determines whether or not the handover failure rate has increased compared with that before a handover suppression parameter was changed (Operation S303). The handover suppression optimization section 203 adjusts the threshold of a mobile terminal section criterion as follows, depending on a change in the handover failure rate.

<In a Case of the Selection Criterion being the Mobility Speed Threshold V>

In a case where a mobile terminal whose mobility speed is not lower than the threshold V is selected as a target of handover suppression, if the handover failure rate Rf has not decreased from that before the handover suppression parameter was changed (Operation S303; NO), the handover suppression parameter is changed toward eased handover suppression (Operation S304). That is, the mobility speed threshold V is increased. If the handover failure rate has decreased from that before the handover suppression parameter was changed (Operation S303; YES), the handover suppression parameter is changed toward tightened handover suppression (Operation S305). That is, the mobility speed threshold V is decreased. Note that when a mobile terminal whose mobility speed is lower than the threshold V is selected as a target of handover suppression, it is also acceptable that handover suppression is eased by decreasing the mobility speed threshold V or is tightened by increasing the mobility speed threshold V.

<In a Case of the Selection Criterion being the Average Cell Stay Duration Threshold Tave>

In a case where a mobile terminal whose average duration of stay in cells where it stayed in the past is not longer than the threshold Tave is selected as a target of handover suppression, if the handover failure rate Rf has not decreased from that before the handover suppression parameter was changed (Operation S303; NO), the average stay duration threshold Tave is decreased, thus changing the handover suppression parameter toward eased handover suppression (Operation S304). If the handover failure rate Rf has decreased from that before the handover suppression parameter was changed (Operation S303; YES), the average stay duration threshold Tave is increased, thus changing the handover suppression parameter toward tightened handover suppression (operation S305). Note that when a mobile terminal whose average cell stay duration is longer than the threshold Tave is selected as a target of handover suppression, it is also acceptable that handover suppression is eased by increasing the average stay duration threshold Tave or is tightened by decreasing the average stay duration threshold Tave.

Note that when the threshold of a mobile terminal selection criterion has reached a predetermined limit value as a result of adjusting the threshold, the criterion may be changed so that a mobile terminal on the other side relative to the threshold will be selected. For example, in a case where a mobile terminal whose mobility speed is not lower than the threshold V is selected, when the threshold V has reached a limit value as a result of increasing it, a change is made such that a mobile terminal of lower than the threshold V will be selected.

As described above, the handover optimization section 201 sequentially changes handover suppression parameters (holding period of time T and selection criterion threshold) based on the amount of a change in the handover failure rate before and after the handover suppression parameters are changed, and notifies them to the base stations.

2.4) Effects

According to the second exemplary embodiment of the present invention, when a handover request is received from a base station managing another cell, handover of a mobile terminal, of which handover is requested, is suppressed if this mobile terminal satisfies a predetermined selection criterion, and the handover optimization section adjusts the degree of handover suppression (holding period of time T and selection criterion threshold) depending on handover quality after handover is suppressed. Thus, in addition to the effects of the first exemplary embodiment, it is possible to perform handover suppression only on a mobile terminal that has high possibility of a handover failure, and to start, without delay, handover of a mobile terminal for which it is determined that handover suppression is not required.

3. Third Exemplary Embodiment

According to a third exemplary embodiment of the present invention, the different point from the above-described second exemplary embodiment is that a mobile terminal whose mobility state satisfies a predetermined condition is selected and handover of only the selected mobile terminal from another cell is rejected. The architecture of a radio communication system according to the third exemplary embodiment is the same as the system architecture shown FIG. 8 as described in the second exemplary embodiment. Hereinafter, the radio communication system and operations of a base station according to the third exemplary embodiment will be described in detail, focusing on the different point from the second exemplary embodiment.

Figure 10:
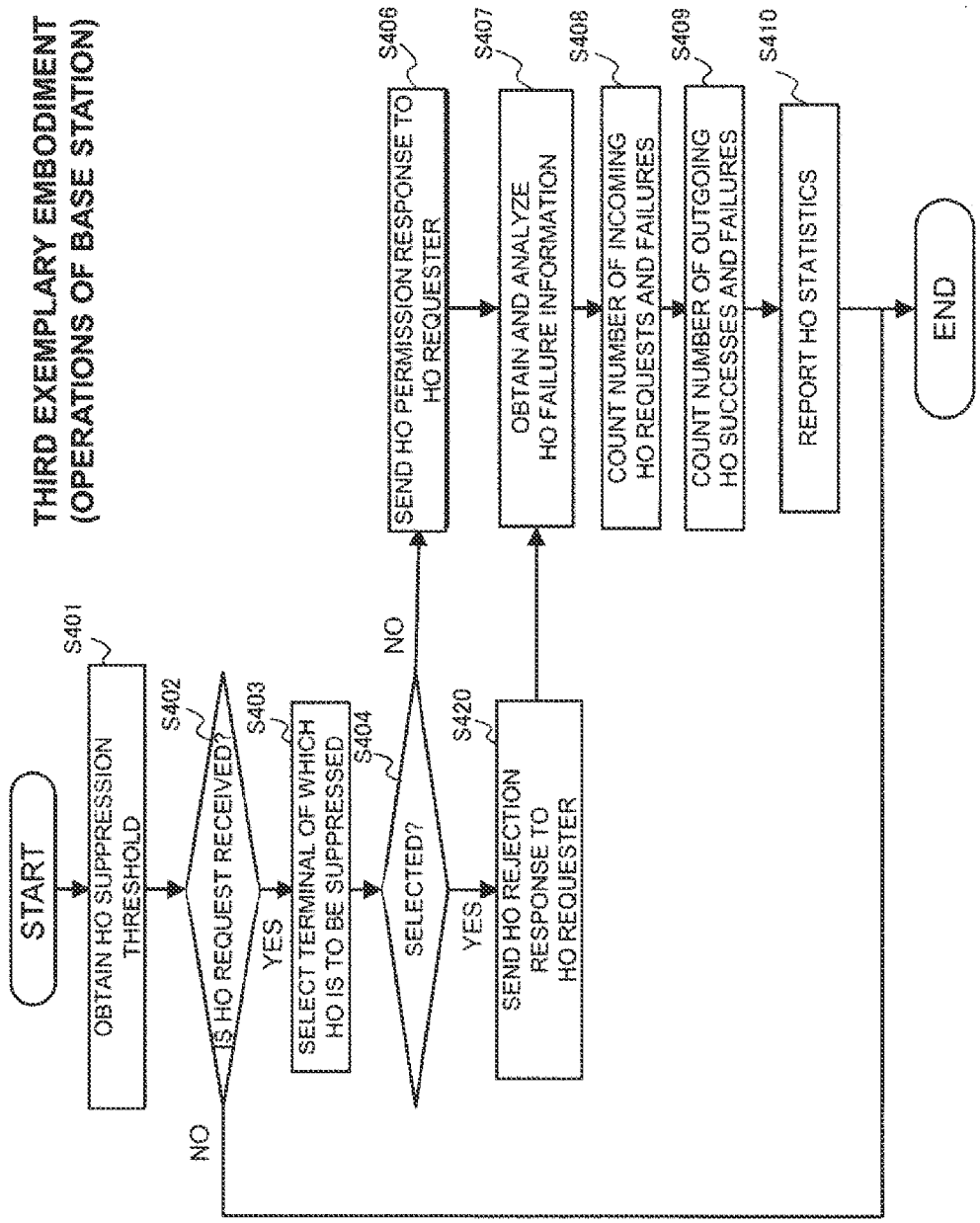
FIG. 10 is a flowchart showing an example of operations of a base station according to a third exemplary embodiment of the present invention.

FIG. 10 is a flowchart showing operations of a base station according to the third exemplary embodiment. Referring to FIG. 10, first, the handover suppression section 102 of the base station 30B obtains a handover suppression parameter from the network management system 20 (Operation S401). In the present exemplary embodiment, however, the handover suppression parameter includes only a threshold of a mobile terminal selection criterion. For the selection criterion, a threshold V of mobility speed of a mobile terminal or a threshold Tave of average duration of a mobile terminal's stay in cells may be used as in the second exemplary embodiment.

Subsequently, a request for handover of the mobile terminal 10 is received from the base station 30A (Operation S402; YES), and if a mobile terminal of which handover should be suppressed is the mobile terminal 10, of which handover is requested (Operations S403 and S404; YES), the handover suppression section 102 returns a handover rejection response to the handover-requesting base station 30A (Operation S420). If the mobile terminal 10 is not a selected one (Operation S404; NO), the handover suppression section 102 returns a handover permission response to the base station 30A (Operation S406). After the handover rejection response or permission response is sent, the handover failure detection section 103 performs Operations S407 to S410 as in the second exemplary embodiment.

The handover suppression optimization section 203 of the network management system 20 that has obtained handover statistics information from each base station calculates the handover failure rate Rf based on the obtained handover statistics information and adjusts the threshold of a mobile terminal section criterion based on a change in the handover failure rate as in the second exemplary embodiment. In this manner, the handover optimization section 201 sequentially changes the handover suppression parameter (selection criterion threshold) based on the amount of a change in the handover failure rate before and after the handover suppression parameter is changed, and notifies it to the base stations.

As described above, according to the third exemplary embodiment of the present invention, if the mobile terminal 10 is a target of handover suppression, a handover rejection response is immediately returned to the base station 30A. Hence, according to the third exemplary embodiment, in addition to the effects of the above-described second exemplary embodiment, even in a case where the base station 30A cannot send a handover request to another cell before it receives a handover response, the base station 30A can promptly receive a handover rejection response, whereby it is possible to reduce handover failures caused by a delay in starting handover.

4. Fourth Exemplary Embodiment

According to a fourth exemplary embodiment of the present invention, the different point from the above-described third exemplary embodiment is that if handover of an incoming handover-target mobile terminal has already been rejected a predetermined number of times or more, handover thereof is permitted. The architecture of a radio communication system according to the fourth exemplary embodiment is the same as the system architecture shown in FIG. 8 as described in the second exemplary embodiment. Hereinafter, the radio communication system and operations of a base station according to the fourth exemplary embodiment will be described in detail, focusing on the different point from the third exemplary embodiment.

Figure 11:
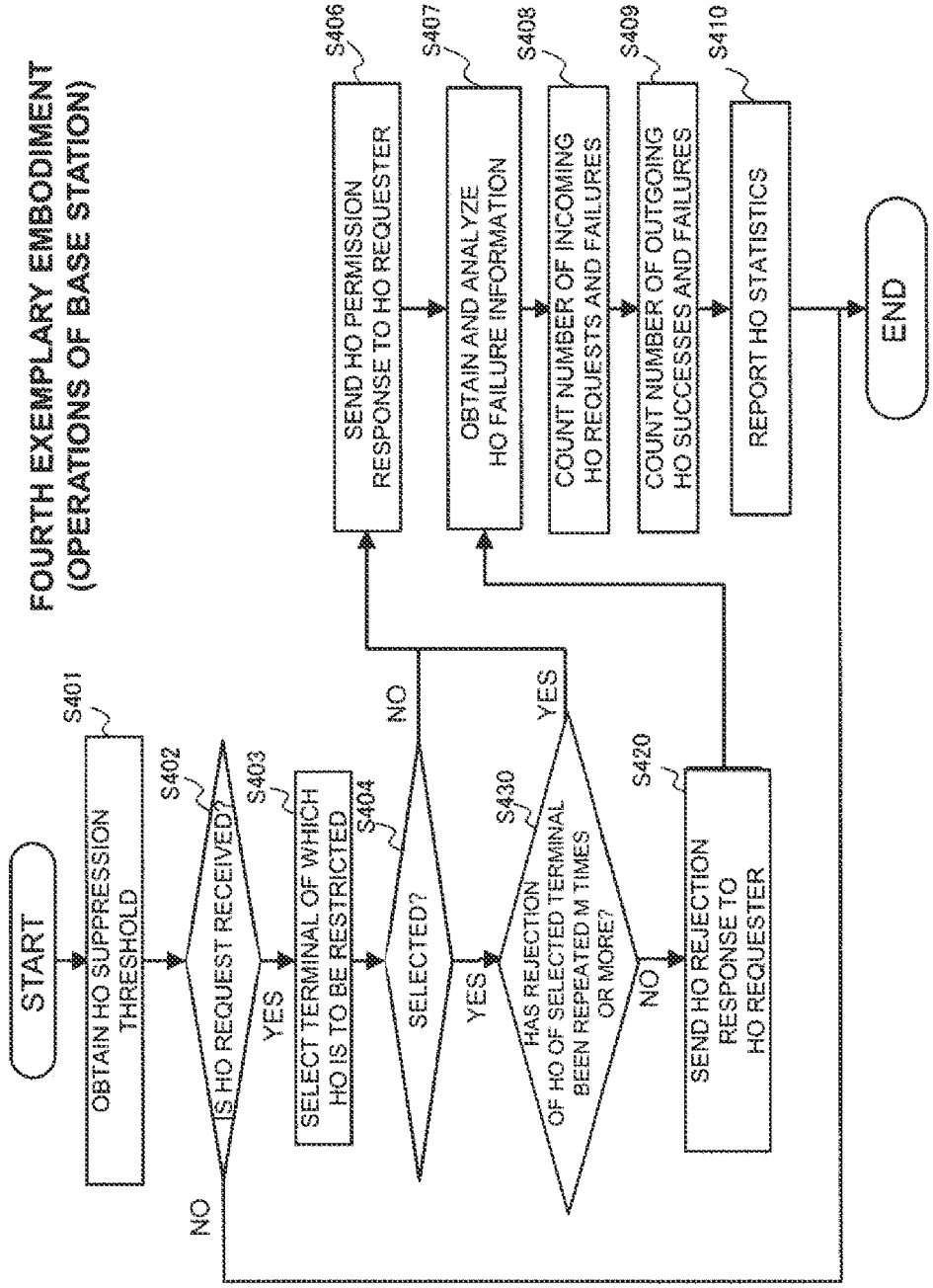
FIG. 11 is a flowchart showing an example of operations of a base station according to a fourth exemplary embodiment of the present invention.

FIG. 11 is a flowchart showing operations of a base station according to the fourth exemplary embodiment. Referring to FIG. 11, first, the handover suppression section 102 of the base station 30B obtains a handover suppression parameter from the network management system 20 (Operation S401). In the present exemplary embodiment, however, the handover suppression parameter includes only a threshold of a mobile terminal selection criterion. For the selection criterion, a threshold V of mobility speed of a mobile terminal or a threshold Tave of average duration of a mobile terminal's stay in cells can be used as in the third exemplary embodiment.

Subsequently, a request for handover of the mobile terminal 10 is received from the base station 30A (Operation S402; YES), and If a mobile terminal of which handover should be suppressed is the mobile terminal 10, of which handover is requested (Operations S403 and S404; YES), the handover suppression section 102 determines whether or not handover of this mobile terminal 10 has been rejected a predetermined number M of times or more in the past (Operation S430). If the number of handover rejections has not reached M (Operation S430; NO), the handover suppression section 102 returns a handover rejection response to the handover-requesting base station 30A (Operation S420). When the mobile terminal 10 is not a selected one (Operation S404; NO), or when the number of handover rejections has reached M (Operation S430; YES), the handover suppression section 102 returns a handover permission response to the base station 30A (Operation S406). After the handover rejection response or permission response is sent, the handover failure detection section 103 performs Operations S407 to S410 as in the second exemplary embodiment.

The handover suppression optimization section 203 of the network management system 20 that has obtained handover statistics information from each base station calculates the handover failure rate Rf based on the obtained handover statistics information and adjusts the threshold of a mobile terminal selection criterion based on a change in the handover failure rate as in the second exemplary embodiment. In this manner, the handover optimization section 201 sequentially changes the handover suppression parameter (selection criterion threshold) based on the amount of a change in the handover failure rate before and after the handover suppression parameter is changed, and notifies it to the base stations.

As described above, according to the fourth exemplary embodiment of the present invention, a request for handover of a mobile terminal that is a target of handover suppression is rejected until rejections thereof reaches a predetermined number. Hence, according to the fourth exemplary embodiment, in addition to the effects of the described-above third exemplary embodiment, it is possible to reduce handover failures when a mobile terminal selection criterion is not optimal for an own cell

5. Fifth Exemplary Embodiment

According to a fifth exemplary embodiment of the present invention, the different point from the above-described first to fourth exemplary embodiments is that when a handover request is received from a base station managing another cell, a response for rejecting this incoming handover is returned if a holding period of time T adjusted by the handover optimization section has reached an upper-limit value. The architecture of a radio communication system according to the fifth exemplary embodiment is the same as the system architecture shown in FIG. 8 as described in the second exemplary embodiment. Hereinafter, the radio communication system and operations of a base station according to the fifth exemplary embodiment will be described in detail, focusing on the different point from the first to fourth exemplary embodiments.

FIG. 12 is a flowchart showing operations of a base station according to the fifth exemplary embodiment. Referring to FIG. 12, first, the handover suppression section 102 of the base station 30B obtains handover suppression parameters from the network management system 20 (Operation S401). In the present exemplary embodiment, however, the handover suppression parameters include a holding period of time T and a threshold of a mobile terminal selection criterion. For the selection criterion, a threshold V of mobility speed of a mobile terminal or a threshold Tave of average duration of a mobile terminal's stay in cells can be used as in the second exemplary embodiment.

Subsequently, a request for handover of the mobile terminal 10 is received from the base station 30A (Operation S402; YES), and If a mobile terminal of which handover should be suppressed is the mobile terminal 10, of which handover is requested (Operations S403 and S404; YES), the handover suppression section 102 determines whether or not the holding period of time T, a handover suppression parameter, has reached a predetermined upper-limit value (Operation S440). If it has not reached the upper-limit value (Operation S440; NO), the handover suppression section 102 holds the transmission of a response to the handover request for the period of time T indicated by the handover suppression parameter (Operation S441) and, when the holding period of time T has elapsed, returns a handover permission response to the base station 30A (Operation S442).

When the mobile terminal 10 is not a selected one (Operation S404; NO), the handover suppression section 102 returns a handover permission response to the base station 30A without holding it (Operation S442). Moreover, if the holding period of time T has reached the predetermined upper-limit value (Operation S440; YES), the handover suppression section 102 returns a handover rejection response to the base station 30A without holding it (Operation S443). After the handover rejection response or permission response is sent, the handover failure detection section 103 performs Operations S407 to S410 as in the second exemplary embodiment.

The handover suppression optimization section 203 of the network management system 20 that has obtained handover statistics information from each base station calculates the handover failure rate Rf based on the obtained handover statistics information and adjusts the holding period of time T and the threshold of a mobile terminal selection criterion based on a change in the handover failure rate as in the second exemplary embodiment. In this manner, the handover optimization section 201 sequentially changes the handover suppression parameters (holding period of time T and selection criterion threshold) based on the amount of a change in the handover failure rate before and after the handover suppression parameters are changed, and notifies them to the base stations.

As described above, according to the fifth exemplary embodiment of the present invention, when a handover request is received from a base station managing another cell, a response for rejecting this handover is immediately returned to the base station 30A if the mobile terminal 10 is a target of handover suppression and if the holding period of time T has reached the upper-limit value. If the holding period of time T has not reached the upper limit, a handover permission response is hold for the period of time T. If the mobile terminal 10 is not a target of handover suppression, a handover permission response is immediately returned to the base station 30A. Hence, according to the fifth exemplary embodiment, in addition to the effects of the above-described first to fourth exemplary embodiments, it is possible to reduce handover failures when a mobile terminal selection criterion is not optimal for an own cell, and further, it is hard for a handover failure to occur due to a delay in starting handover when a handover-requesting base station cannot perform handover to another cell.

INDUSTRIAL APPLICABILITY

The present invention is applicable to inter-cell handover control in mobile communication systems.

REFERENCE SIGNS LIST 10, 10a, 10b Mobile terminal
20 Network management system
30, 30A, 30B Base station (eNB)
101, 101A, 101B, 101C Handover control section
102 Handover suppression section
103 Handover failure detection section
104 Mobile terminal selection section
201 Handover optimization section
202 Quality statistics storage section
203 Handover suppression optimization section

The invention claimed is:
1. A radio communication system, comprising:
a first base station, wherein the first base station manages a first cell;
a second base station, wherein the second base station manages a second cell, and
wherein the second base station comprises:
a handover suppression section that is configured to, when receiving from the first base station a request for handover to the second cell, suppress the handover in accordance to a degree of handover suppression level; and
a handover failure detection section that is configured to detect handover failures caused by the handover suppression, to manage handover statistics information; and
a network management system that comprises:
a handover suppression optimization section that is configured to adjust the degree of handover suppression level based on a rate of occurrence of the handover failures which is calculated based on the handover statistics information received from the handover failure detection section.

2. The radio communication system according to claim 1, wherein the handover suppression section suppresses the handover by holding a response to the request for handover for a predetermined period of time.

3. The radio communication system according to claim 2, wherein the handover suppression section sets the period of time of holding the response to the request for handover to a period of time unique to the first cell.

4. The radio communication system according to claim 2, wherein the handover suppression optimization section adjusts the degree of handover suppression level by changing the period of time of holding the response to the request for handover.

5. The radio communication system according to claim 1, further comprising a mobile terminal selection section that selects a mobile terminal of which handover should be suppressed, depending on a selection criterion based on a mobility state of a mobile terminal.

6. The radio communication system according to claim 5, wherein the handover suppression section suppresses only handover of the mobile terminal selected by the mobile terminal selection section.

7. The radio communication system according to claim 5, wherein the handover suppression optimization section adjusts the degree of handover suppression level by changing the selection criterion.

8. The radio communication system according to claim 5, wherein the selection criterion is based on a predetermined threshold of mobility speed of the mobile terminal.

9. The radio communication system according to claim 5, wherein the selection criterion is based on a predetermined threshold of duration of the mobile terminal's stay in cells where the mobile terminal stayed in a past.

10. The radio communication system according to claim 1, further comprising a mobility terminal selection section that selects a mobile terminal of which handover should be suppressed, depending on a selection criterion based on a mobility state of a mobile terminal,
wherein the handover suppression section suppresses the handover by returning a response for rejecting the request for handover to the first base station.

11. The radio communication system according to claim 10, wherein the handover suppression section suppresses only handover of the mobile terminal selected by the mobile terminal selection section.

12. The radio communication system according to claim 10, wherein the handover suppression optimization section adjusts the degree of handover suppression level by changing the selection criterion.

13. The radio communication system according to claim 10, wherein the selection criterion is based on a predetermined threshold of mobility speed of the mobile terminal.

14. The radio communication system according to claim 10, wherein the selection criterion is based on a predetermined threshold of average duration of the mobile terminal's stay in cells where the mobile terminal stayed in a past.

15. The radio communication system according to claim 10, wherein the handover suppression section returns a response for permitting the request for handover when handover of the mobile terminal that is a target of the handover suppression has been suppressed over a predetermined number of times in a past.

16. The radio communication system according to claim 10, wherein the handover suppression section suppresses the handover by holding a response to the request for handover for a predetermined period of time,
wherein the handover suppression optimization section changes the period of time of holding the response to the request for handover based on a rate of occurrence of the handover failure, and
the handover suppression section returns a response for rejecting the request for handover when the holding period of time exceeds a predetermined value.

17. A handover control method in a radio communication system including base stations that manage cells to which mobile terminals connect, wherein a first base station manages a first cell and a second base station manages a second cell, comprising:
at the second base station;
when receiving from the first base station a request for handover to the second cell, suppressing the handover in accordance with a degree of handover suppression level;
detecting handover failures caused by the handover suppression, to manage handover statistics information; and adjusting the degree of handover suppression level based on a rate of occurrence of the handover failures which is calculated based on the handover statistics information.

18. The handover control method according to claim 17, wherein the handover is suppressed by holding a response to the request for handover for a predetermined period of time.

19. The handover control method according to claim 18, wherein the period of time of holding the response to the request for handover is set to a period of time unique to the first cell.

20. The handover control method according to claim 18, wherein the degree of handover suppression level is adjusted by changing the period of time of holding the response to the request for handover.

21. The handover control method according to claim 17, wherein a mobile terminal of which handover should be suppressed is selected depending on a selection criterion based on a mobility state of a mobile terminal.

22. The handover control method according to claim 21, wherein only handover of the selected mobile terminal is suppressed.

23. The handover control method according to claim 21, wherein the degree of handover suppression level is suppressed by changing the selection criterion.

24. The handover control method according to claim 21, wherein the selection criterion is based on a predetermined threshold of mobility speed of the mobile terminal.

25. The handover control method according to claim 21, wherein the selection criterion is based on a predetermined threshold of average duration of the mobile terminal's stay in cells where the mobile terminal stayed in a past.

26. The handover control method according to claim 17, wherein a mobile terminal of which handover should be suppressed is selected depending on a selection criterion based on a mobility state of a mobile terminal, and
the handover is suppressed by returning a response for rejecting the request for handover to the base station managing the first cell.

27. The handover control method according to claim 26, wherein only handover of the selected mobile terminal is suppressed.

28. The handover control method according to claim 26, wherein the degree of handover suppression level is adjusted by changing the selection criterion.

29. The handover control method according to claim 26, wherein the selection criterion is based on a predetermined threshold of mobility speed of the mobile terminal.

30. The handover control method according to claim 26, wherein the selection criterion is based on a predetermined threshold of average duration of the mobile terminal's stay in cells where the mobile terminal stayed in a past.

31. The handover control method according to claim 26, wherein a response for permitting the request for handover is returned when handover of the mobile terminal that is a target of the handover suppression has been suppressed over a predetermined number of times in a past.

32. The handover control method according to claim 26, wherein the handover is suppressed by holding a response to the request for handover for a predetermined period of time,
the period of time of holding the response to the request for handover is changed based on a rate of occurrence of the handover failure, and
a response for rejecting the request for handover is returned when the holding period of time exceeds a predetermined value.

33. A base station managing a cell to which a mobile terminal connects in a radio communication system, comprising:
a handover suppression section that is configured to, when receiving from another base station managing another cell a request for handover to the cell, suppress the handover in accordance with a degree of handover suppression level;
a handover failure detection section that is configured to detect handover failures caused by the handover suppression, to manage handover statistics information; and
a handover suppression optimization section that is configured to adjust the degree of handover suppression level based on a rate of occurrence of the handover failures which is calculated from the handover statistics information received from the handover failure detection section.

34. The base station according to claim 33, further comprising a control section that controls the handover suppression section by notifying handover statistics information to a network management system and receiving information about the degree of handover suppression level which is adjusted based on the handover statistics information by the network management system.

35. A handover optimization method in a radio communication system including base stations that manage cells to which mobile terminals connect, wherein a first base station manages a first cell and a second base station manages a second cell, comprising:
at a second base station:
when receiving from the first base station a request for handover to the second cell, suppressing the handover in accordance with a degree of handover suppression level; and
detecting handover failures caused by the handover suppression, to manage handover statistics information; and
at a network management system:
adjusting the degree of handover suppression level based on a rate of occurrence of the handover failures which is calculated based on the handover statistics information.

* * * * *